US006680442B1

(12) United States Patent
Rynd et al.

(10) Patent No.: US 6,680,442 B1
(45) Date of Patent: Jan. 20, 2004

(54) MOBILE HOSPITAL BED SCALE

(75) Inventors: Richard Rynd, Baltimore, MD (US); Adam T. Ashpes, Baltimore, MD (US)

(73) Assignee: EZE Weigh, LLC, Owings Mills, MD (US)

( * ) Notice: Subject to any disclaimer, the term of this patent is extended or adjusted under 35 U.S.C. 154(b) by 0 days.

(21) Appl. No.: 09/653,829

(22) Filed: Sep. 1, 2000

Related U.S. Application Data

(63) Continuation-in-part of application No. PCT/US99/27529, filed on Nov. 19, 1999, which is a continuation-in-part of application No. 09/097,128, filed on Jun. 12, 1998, now Pat. No. 5,990,423.
(60) Provisional application No. 60/086,999, filed on May 28, 1998, and provisional application No. 60/209,431, filed on Jun. 2, 2000.

(51) Int. Cl.⁷ .......................... G01G 19/08; G01G 19/10
(52) U.S. Cl. ...................... 177/140; 177/141; 177/144; 177/146; 254/2 C
(58) Field of Search ................................. 177/140, 141, 177/144, 146; 254/2 C

(56) References Cited

U.S. PATENT DOCUMENTS

| 3,217,818 A | 11/1965 | Engelsher et al. .......... 177/141 |
| 3,431,992 A | 3/1969 | Whitecar ..................... 177/140 |
| 4,002,215 A | 1/1977 | Harvil .......................... 177/130 |
| 4,006,789 A | 2/1977 | Stultz ........................... 177/126 |
| 4,281,730 A | 8/1981 | Swersey et al. ............. 177/126 |
| 4,403,680 A | 9/1983 | Hillesheimer ................ 177/146 |
| 4,487,276 A | 12/1984 | Swersey et al. ............. 177/126 |
| 4,584,989 A | 4/1986 | Stith et al. ..................... 600/18 |
| 4,669,136 A | 6/1987 | Waters et al. ................ 177/144 |
| 4,793,428 A | 12/1988 | Swersey ....................... 177/144 |
| 4,961,470 A | 10/1990 | Koerber, Sr. ................. 177/144 |
| 4,974,692 A | 12/1990 | Carruth ......................... 177/144 |
| 5,173,977 A | 12/1992 | Carruth et al. ............... 177/144 |
| 5,319,817 A | 6/1994 | Hay et al. ..................... 177/144 |
| 5,393,935 A | 2/1995 | Hasty et al. .................... 177/45 |
| 5,393,938 A | 2/1995 | Bumbalough ................ 177/144 |
| 5,612,515 A | 3/1997 | Eisen ........................... 177/126 |
| 5,739,478 A | 4/1998 | Zefira .......................... 177/130 |
| 5,747,745 A | 5/1998 | Neuman ...................... 177/132 |
| 5,990,423 A | * 11/1999 | Ashpes et al. ............... 177/140 |
| 6,124,554 A | * 9/2000 | Muckle et al. ............... 177/126 |

FOREIGN PATENT DOCUMENTS

| DE | 3534559 A | 4/1987 |
| EP | 0854357 A | 7/1998 |

* cited by examiner

Primary Examiner—Randy Gibson
(74) Attorney, Agent, or Firm—Brooke Schumm, III; Daneker, McIntire, Schumm, et al.

(57) ABSTRACT

A mobile hospital patient bed scale is contemplated which lifts the entire bed with patient in situ on a load platform with a non-slip surface. The scale minimizes both vertical and horizontal displacement. The platform has load cells which deliver data to a memory and display device. The invention is portable and partly foldable to aid in storage. It provides for recharging if desired, and for use of an auxiliary power source if desired. The driving force for lifting may be a hydraulic ram or an electrically powered screw drive.

99 Claims, 14 Drawing Sheets

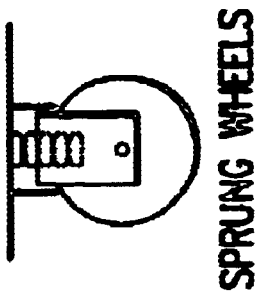
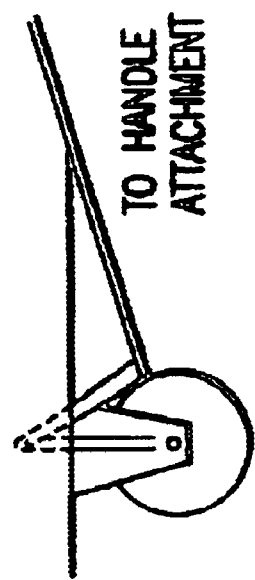
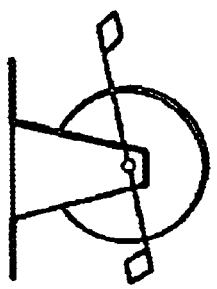

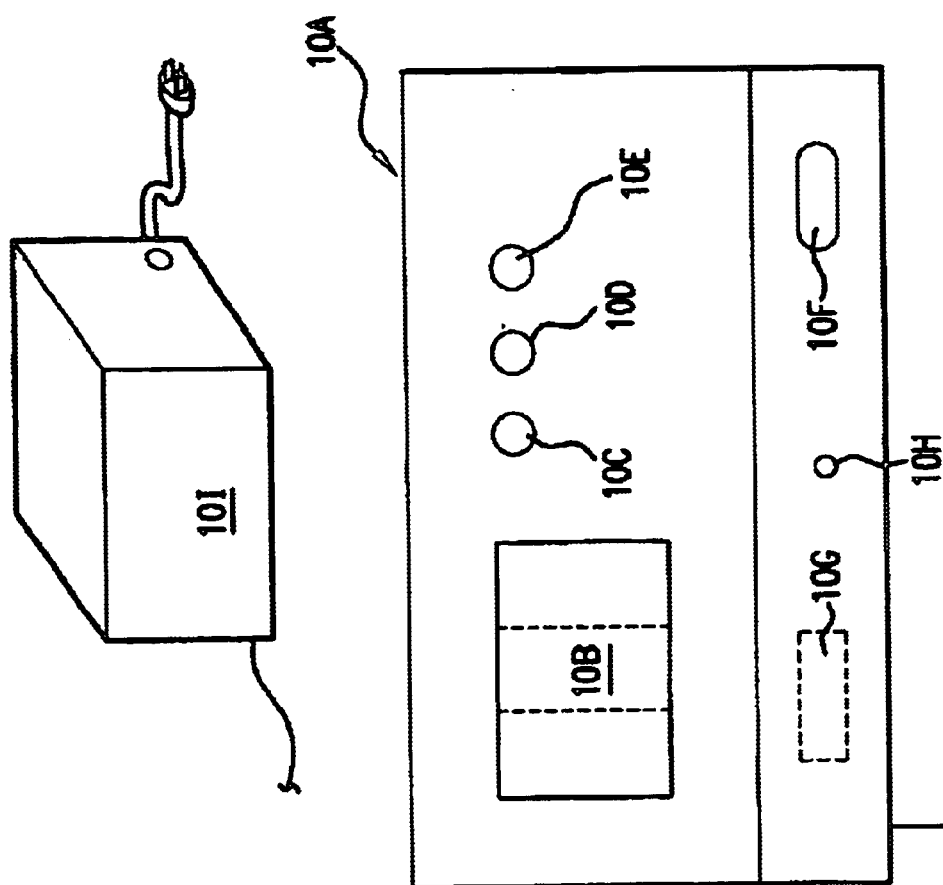
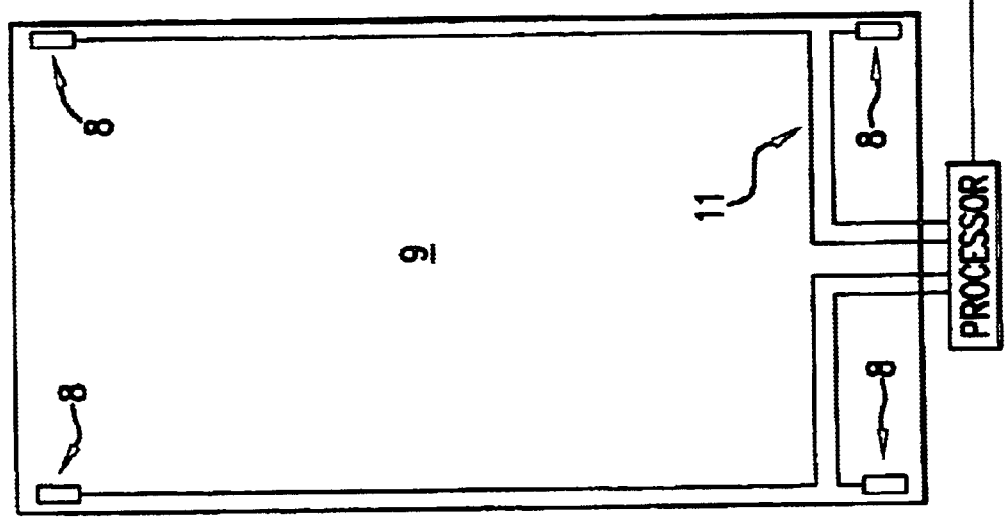
FIG. 4

PLATFORM IN RAISED POSITION WITH WHEELS RAISED (FROM REAR)

PLATFORM IN LOWERED POSITION WITH WHEELS LOWERED (FROM REAR)

PLATFORM AND FOLDING HANDLE IN LOWERED POSITION WITH FLOOR GRIPPING PLUNGERS RETRACTED (FROM SIDE)

MOBILE HOSPITAL BED SCALE

CROSS-REFERENCES

In the United States, this application is a continuation-in-part of PCT Appl. 99/27529 filed in the United States as Receiving Office on Nov. 19, 1999 and designating the United States, which in turn is a continuation-in-part of U.S. patent application Ser. No. 09/097,128, filed Jun. 12, 1998, now U.S. Pat. No. 5,990,423, which was a continuation-in-part of a provisional application by the name of A Mobile Hospital Bed Scale filed on May 28, 1998 invented by Adam T. Ashpes and Richard Rynd to which Serial No. 60/086999 was assigned. A provisional application was filed on Jun. 2, 2000 as Serial No. 60/209,431.

BACKGROUND

1. Field of the Invention

The invention is a mobile hospital bed scale which slides under a hospital or nursing bed, with patient in situ. With a minimum of disturbance of the patient, a person can operate the mobile hospital bed scale to lift the entire bed slightly, with patient in place, as opposed to lifting the patient apart from the bed, and as opposed to implanting the scale in the bed; The mobile hospital bed scale is used to determine the weight of bed and patient. If a memory device is programmed with the tare weight of the bed, the patient's weight can be determined, or stored for future recall and reference. The data can be downloaded to a computer for automated use and analysis. The mobile hospital bed scale is portable and can be moved from bed to bed. The bed can be operated by an electrically powered drive or can be battery operated.

2. Description of Related Art

Weighing bedridden hospital patients is a time consuming and unpleasant task. An obvious and unpleasant way to weigh patients is to put a sling underneath them, and hoist them by a spring scale. This disturbs the patient. Fosteret al, U.S. Pat. No. 5,672,849 is a variation on this theme and contemplates building the bed with a patient support built on a frame that can be raised and lowered on the bed. This requires the adaptation of all hospital beds to this scale, which is expensive. The present invention avoids that bed-by-bed expense and the disturbance of the patient.

In Stultz et al, U.S. Pat. No. 4,006,789, the inventor proposes to slide a horizontal table under the patient and then weigh the patient. The necessary tipping or related movement of the patient to get the scale underneath the patient is sometimes referred to as "log-rolling." Not only does the invention disturb the patient, but the invention is somewhat bulky and takes up more storage space than the present invention. Swersey et al, U.S. Pat. No. 4,487,276, Dec. 11, 1984 attempts to eliminate some of the bulk by having a tip-up platform, but still requires sliding a horizontal table under the patient to weigh the patient. Hay et al, U.S. Pat. No. 5,319,817 Jun. 14, 1994 also contemplates a tip-up, fold-up horizontal platform slid under the patient. Both the sling and the horizontal table inventions require substantial movement of the patient. Such movement is one of the largest sources of disability injury to employees of ambulatory care facilities. Other patents such as Eisen, U.S. Pat. No. 5,612,515, Mar. 18, 1997, are of the same genre.

Swersey, U.S. Pat. No. 4,793,428, Dec. 27, 1988, is entitled "Hospital Bed with an Integrated Scale." As the name suggests the scale is in the bed. Weighing patients is very important and needs to be done for bedridden patients approximately once per day. The expense of equipping an entire ambulatory facility with such beds and bed scales is substantial. That expense for multiple beds is eliminated by the present invention.

Stith et al, U.S. Pat. No. 4,589,989, Apr. 29, 1986 contemplates a scale mounted on and in a bed frame. The invention appears intended for acute care. Koerber, Sr., U.S. Pat. 4,961,470 Oct. 9, 1990 also contemplates a weighing mechanism as part of the bed. The Stith and Koerber inventions are not practical for large multiple bed facilities because, again, weighing patients is very important and needs to be done for bedridden patients approximately once per day. The expense of equipping an entire ambulatory facility with such beds and bed scales is substantial. That expense for multiple beds is eliminated by the present invention. Other patents such as Bumbalough, U.S. Pat. No. 5,393,938 are of the same genre.

Carruth et al, U.S. Pat. No. 4,974,692, Dec. 4, 1990 contemplated a weigh bed with two frames, but contemplates that there will be a weigh frame associated with each bed. The frame is not adapted to be used with multiple types of beds. Carruth et al, U.S. Pat. No. 5,173,977, Dec. 29, 1992 also contemplated using a load cell, but not in a combination as facile or designed like the present invention.

Hasty et al, U.S. Pat. No. 5,393,935 takes a different approach by having multiple slats slid under a mattress with load cells on each end. It still requires patient movement and does not appear to contemplate a memory device for the tare weight of the mattress or for the patient weight.

The Engelsher art, U.S. Pat. No. 3,217,818, Nov. 16, 1965, uses a similar but different concept than the Hasty '935 patent. Engelsher contemplates minimizing patient movement by placing a platform on a bed frame and using inflatable airtight means to communicate with a measuring device and determine weight from the pressure generated when the airtight means is pumped to hold the patient's weight.

Waters et al, U.S. Pat. No. 4,669,136 falls in the same genre as the Stith invention as an in-bed weighing device.

Swersey et al, U.S. Pat. No. 4,281,730, has an "under bed" scale which achieves many of the patient care objects of this invention and relieves a source of disability injury. However, that bed scale requires a pair of scales onto which the bed is rolled.

Whitecar, U.S. Pat. No. 3,341,992, Mar. 11, 1969 designed for use with a forklift, contemplates locating a series of cylinders under a platform and having pistons protrude through the platform to hold the lifted weight and then measure the weight by the resulting pressure on pre-pressurized cylinder pistons.

Zefira U.S. Pat. No. 5,739,478, Apr. 14, 1998, similar to Whitecar, designed for weighing pallets, contemplates cylinders below a platform and a retractable contact member that contacts the pallet.

Harvill, U.S. Pat. No. 4,002,115, somewhat similarly to Whitecar contemplates removing a display means and weighing a bulk storage tank, or alternatively, situating three jacks to lift a bulk storage tank.

Neuman, U.S. Pat. No. 5,747,745, May 5, 1998, provides for a housing for attachment to a lower portion of a bed and requires attachment to a bed. Neuman's invention then requires that a support means must be extended. Once mounted to a bed in the housing, a load cell is used for weighing. The contemplation in the Neuman invention is to retrofit beds to have the Neuman system mounted on the beds.

Hillesheim, U.S. Pat. No. 4,403,680, Sep. 13, 1983, contemplates using a hydraulic cylinder to drive a scissors jack under a platform, and then measuring the resultintg pressure in the hydraulic driving cylinder to determine the weight of the object on the platform. A system of compensating for friction effects of the piston and the scissors system is included in the claims.

The present invention eliminates any patient movement with respect to the bed. The present invention only requires a small vertical movement of the bed on the platform sufficient to allow the platform to bear the weight of the patient and bed, which can be two inches of vertical lift of the bed or less.

Previous to the initial application for the underlying applications to this particular invention, the inventors had developed an initial model of the invention to review its potential attributes and experiment with it. That model was very simply a motorcycle lift with a platform with load cells placed on it. The motorcycle lift had a pivot mechanism with some horizontal displacement as the platform was raised. That model had to be dragged into position. The model required a user to stoop and therefore was not economically efficient for use. The model of the invention took too much personnel time to raise the bed. The model required a reset of tare weight for each weighing. Use of the model was abandoned. Thereafter, the invention referenced in U.S. application Ser. No. 09/097,128 was designed. This invention has been improved to provide for steady, even lifting by an electric power source, preferably using a screw drive, which may either be plugged in or be operated from a portable battery, and also has features which enable a more automated use of the invention.

BRIEF DESCRIPTION OF FIGURES

FIG. 3 shows various wheel locking arrangements.

FIG. 4 shows a typical display box and the wiring from the load cells that-sense the bed weight.

OBJECTS or THE INVENTION

Figure 1:
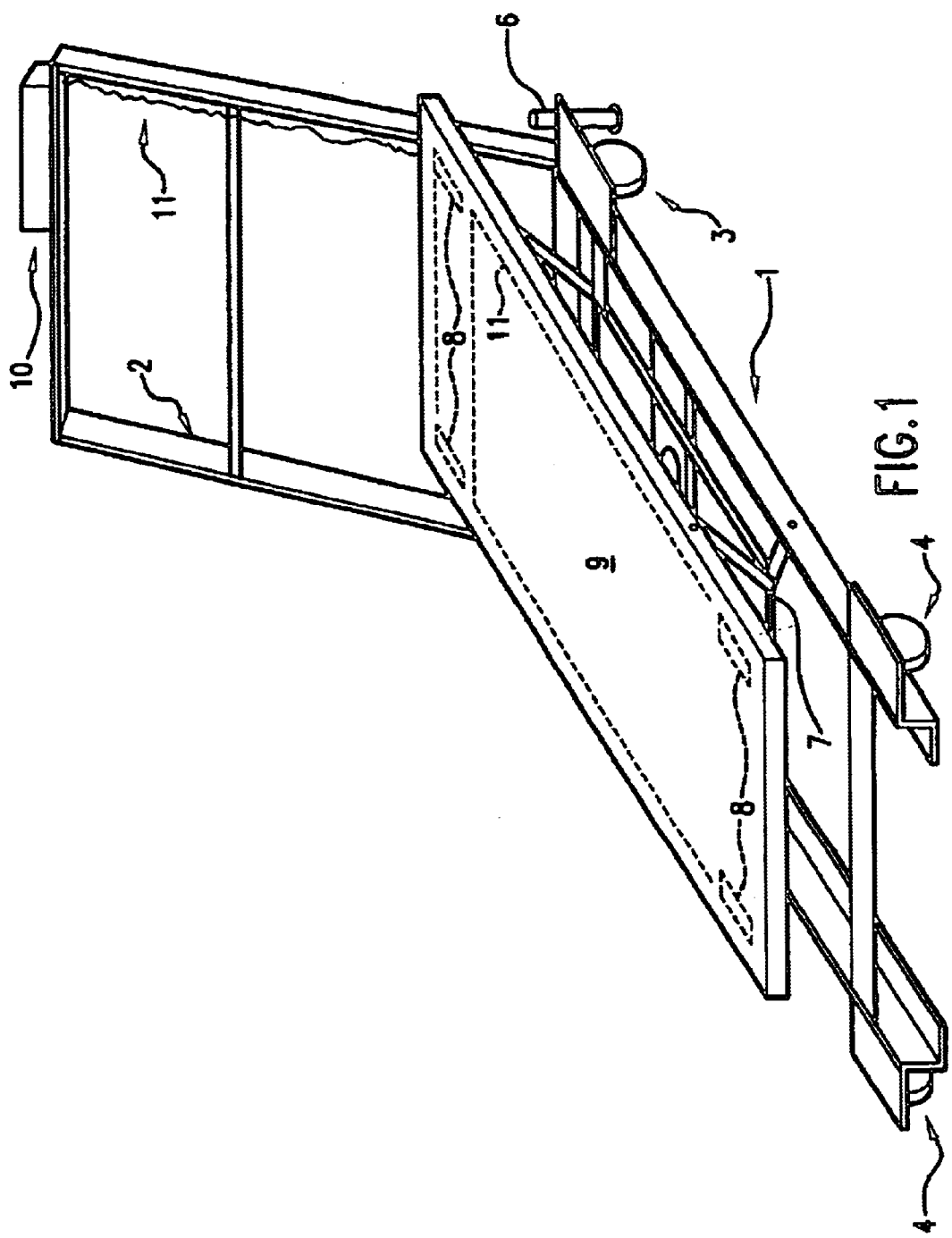
FIG. 1 illustrates the mobile bed scale with pop-down floor grips and the platform to support a hospital bed partially raised.
Figure 2:
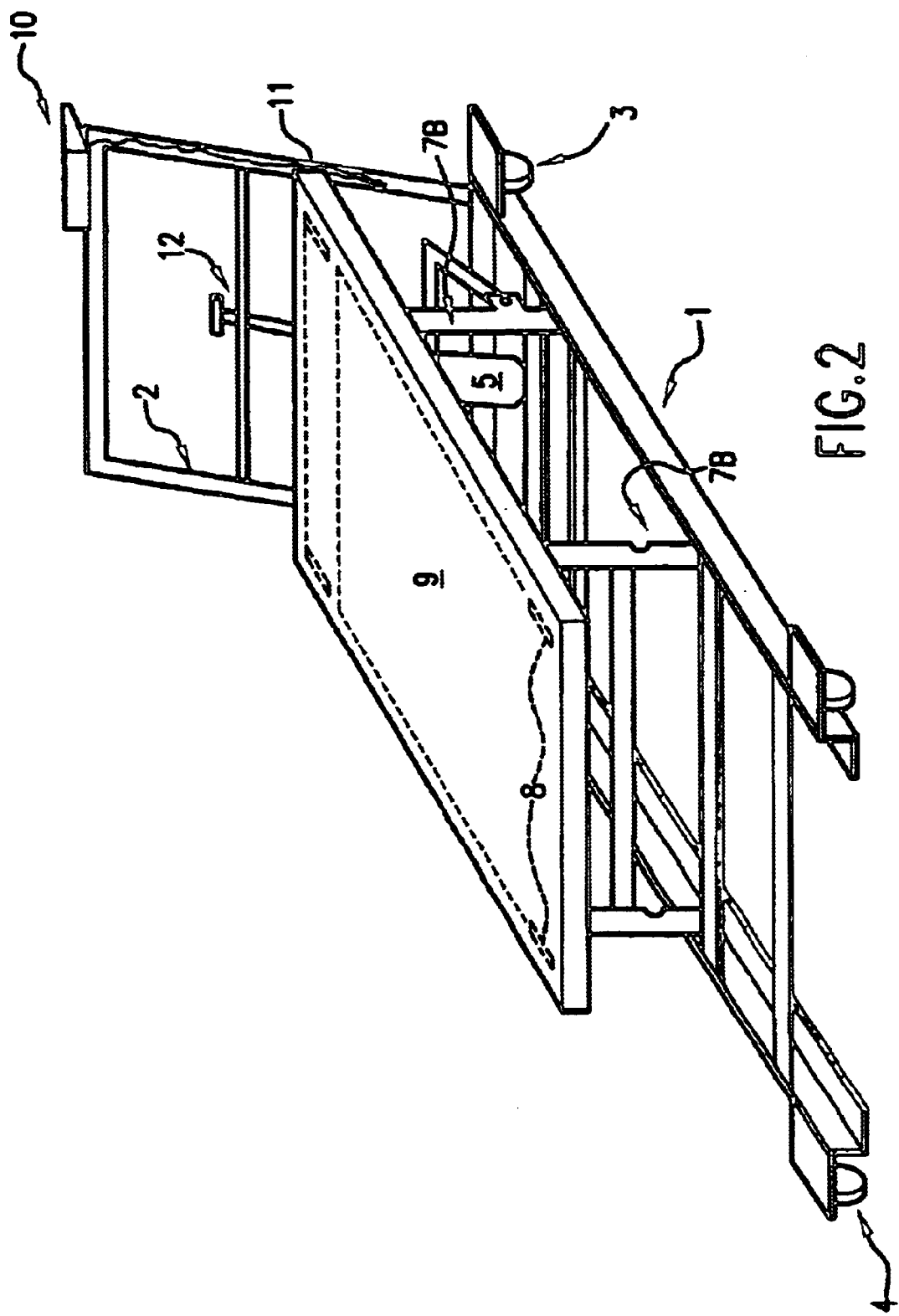
FIG. 2 illustrates the mobile bed scale with a pivot type mechanism and shows the location of a power source for lifting, in this invention, either a foot-operated hydraulic pump or an electric motor with a screw drive. If the hydraulic pump with a piston or ram is used, a release for the piston and pump is shown.

An object of the invention is to enable the tare weight of a bed to be easily ascertained, recorded, and retained.

An object of the invention is to enable a slight person to easily maneuver the invention under a hospital bed and to use it.

An object of one version of the invention is to avoid the necessity of a plug-in power source.

An object of another version of the invention is to permit the raising a lowering of the bed smoothly without the necessity of human power to power the lifting mechanism.

An object of the invention is to create a weighing system or bed scale that can be used with various models of beds.

An object of the invention is to have a memory storage device to store multiple tare weights of beds and multiple weighing so that data can be easily batch-transferred to patient records after an employee has done, for instance, a "row" of beds or rooms in automated fashion. If desired, the invention may have a wireless data transmission apparatus connected to the memory storage device to enable wireless transmission of that data, or use a cradle based transmission with the memory storage device, which could be removable, or a plug-in connection.

An object of the invention is to have scale be potentially self-contained, if desired, by using a battery source(s) for power.

DESCRIPTION OF THE INVENTION

The preferred design for the invention is to use an electric motor with a screw drive, and a linkage which provides leverage to pivot a lifting platform upward, thereby raising a hospital bed. Secondly, the invention, proposes a further option to further automate the patient weighing function by saving in the memory storage device the information concerning individual bed weight and equipment or patient weight and then communicating the information electronically to a central processing unit either by any one of several means of communication including placing the memory storage device in a cradle much like a Palm Pilot (trademark of Palm, Inc., an unaffiliated company), using a plug-in connector, or using a wireless communication system. The motor may be designed to accept either ambient AC voltage, or battery power or both. Recharging and a means for recharging are enhanced to be more flexible. Typical is a plug system of recharging, but also claimed would bare charging by placement of an electromagnetically excited coil adjacent to a second coil to communicate power much like an electric toothbrush is recharged. The invention consists first of a mobile frame base (1). Attached to the mobile frame base are a handle (2) a set of wheels (3) nearest the handle, and steering wheels (4) mounted on the end of the scale away from the handle. The wheels farther away from the handle (4) may be fixed or mobile, but optimally should protrude slightly under the frame.

Figure 5:
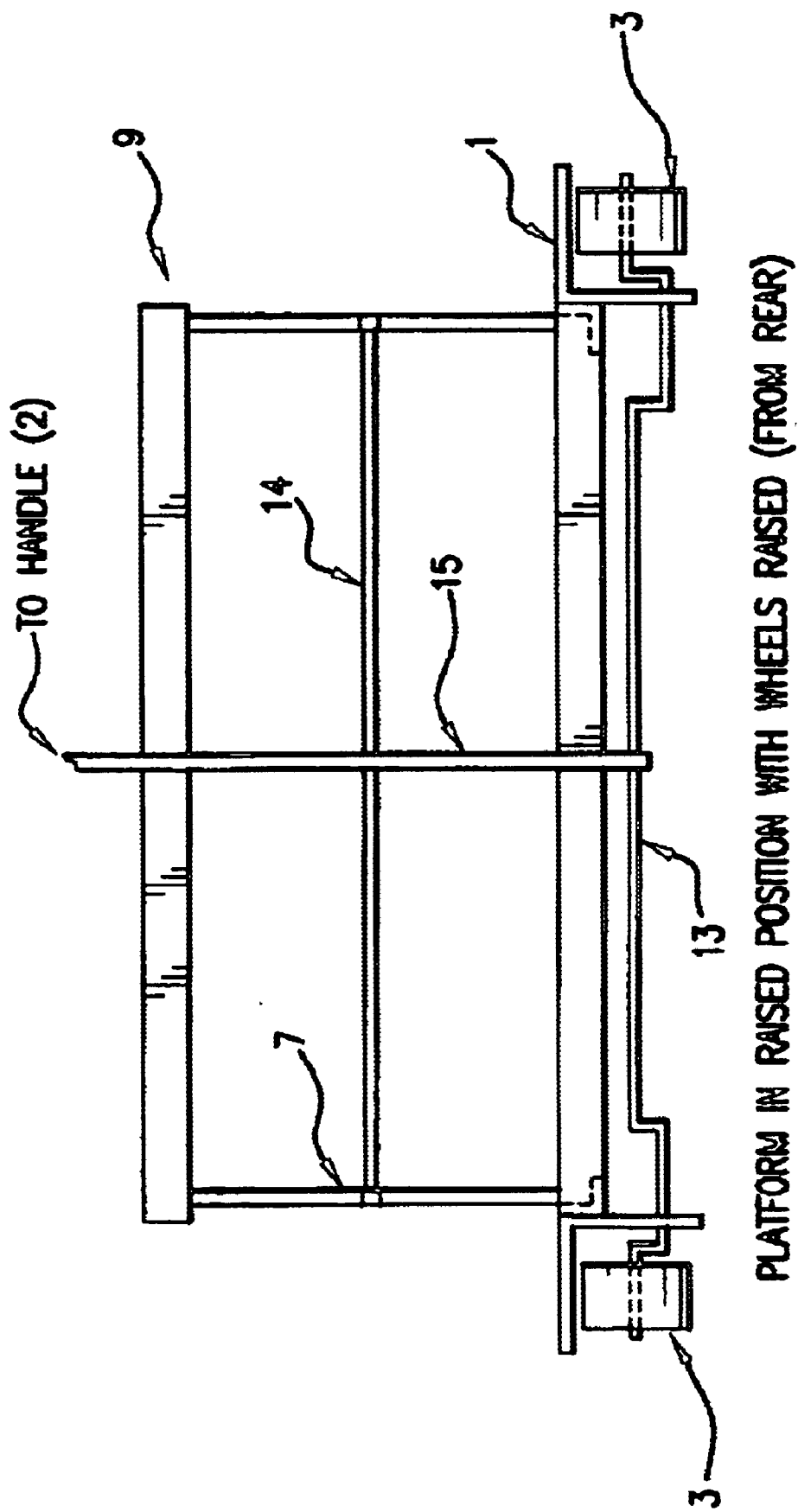
FIG. 5 shows an end view with an offset axle mechanism used to secure the mobile bed scale from moving.
Figure 6:
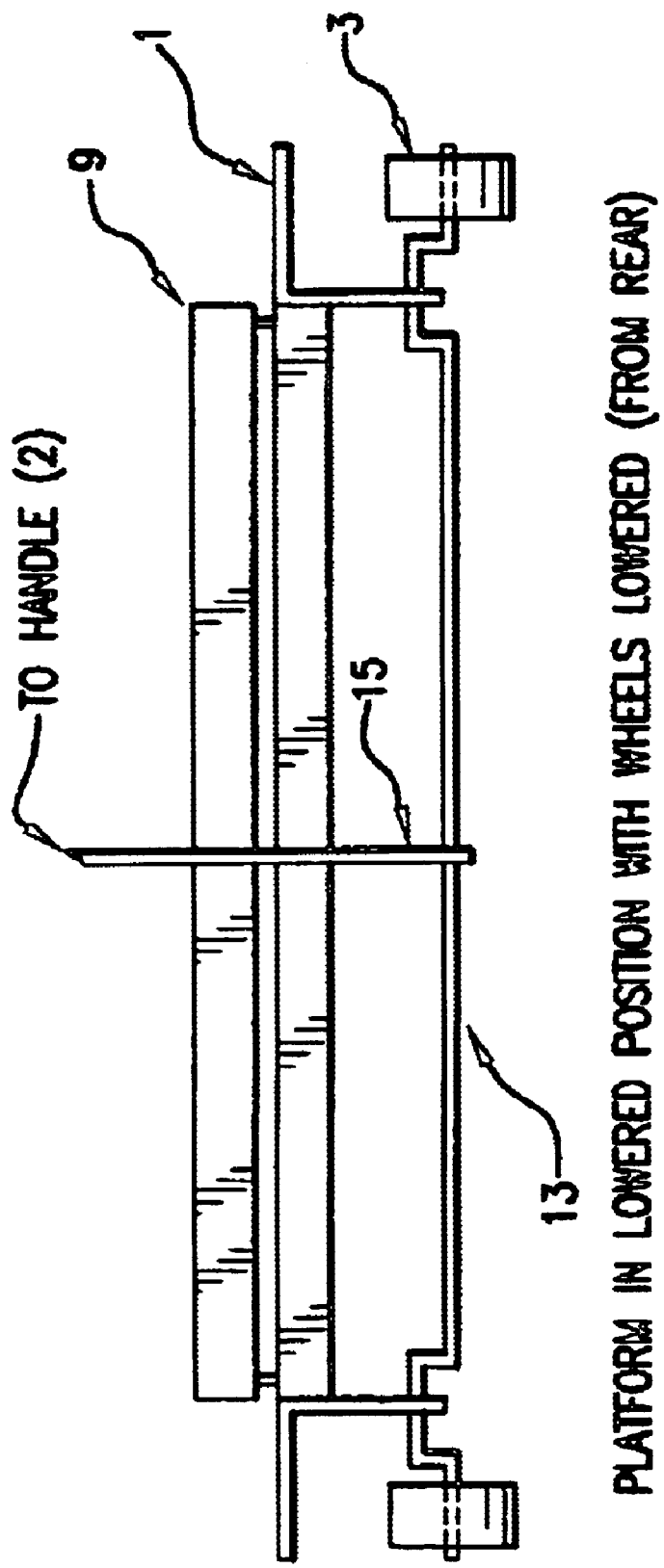
FIG. 6 shows an end view with an offset axle mechanism in a position with the wheels lowered for movement of the scale.

Because the scale has little horizontal movement on elevating a bed, the wheels or frame need not necessarily be locked or secured to the floor on a level floor. However, there may also be a system such that when the handle is lifted, at least one set of wheels rises so that part of the frame rests on the floor to minimize lateral movement of the bed scale and the bed being lifted. In that design, an offset axle (13) in FIG. 5, and an offset axle tie rod (15) to a handle (2), are employed in combination so that when the handle is lifted the wheels are raised (so the mobile frame base rests on the floor) and when the handle is lowered the wheels are lowered (allowing the frame to roll).

Another way to lock the frame to the floor is to use sprung wheels (3B). In this alterative, attached to the frame base proximate to the corners are sprung wheels mounted so that when weight is put on the frame, it presses down on the springs, so that the bottoms of the wheels are even with the bottom of the frame base which bears the weight of the bed being lifted and prevents the apparatus from rolling. This is referred to in this invention as the wheel-spring mechanism. Upon release of the weight of the bed, the wheels "pop down" and the invention can be rolled to the next bed. Because a certain amount of force is required to press the wheels down before the bed is lifted, the memory device recalling the tare weight must have the "press-down" tare weight also stored. Alternatively, locking wheels may be used that are heavier duty caster-type wheels (3C). Another alternative is to use floor gripping plungers or "pop-down floor grips" (6) such as one sees used to hold open doors.

Figure 7:
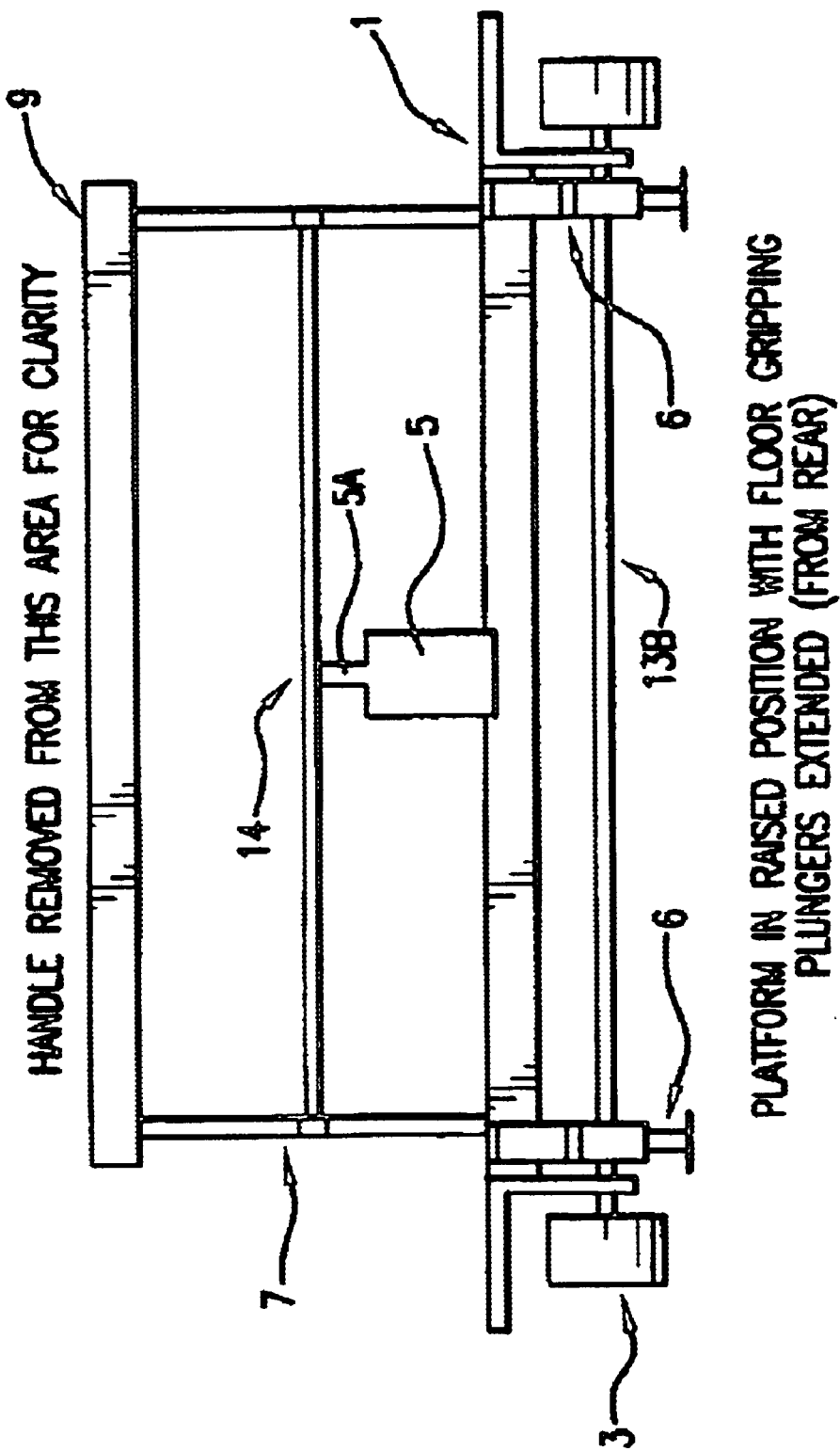
FIG. 7 shows an end view of the mobile bed scale with the handle removed for clarity with the platform in raised position and pop-down floor grips in the locked position.
Figure 8:
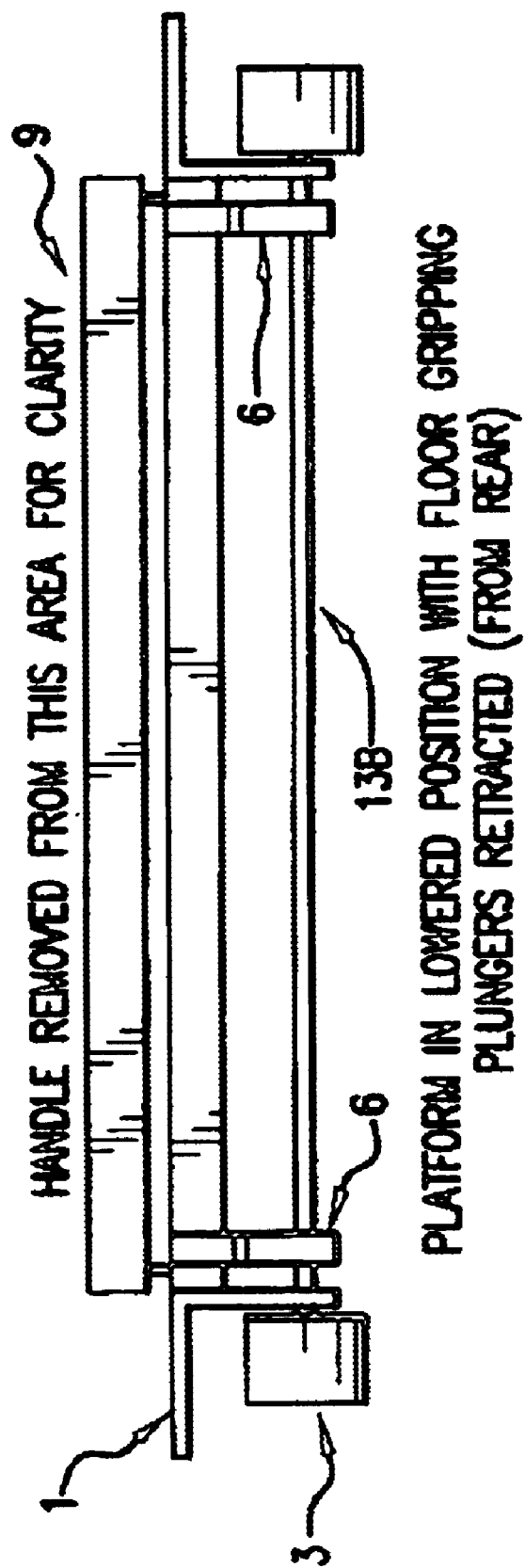
FIG. 8 shows an end view of the mobile bed scale with the handle removed for clarity with the platform in lowered position and pop-down floor grips in the unlocked position.
Figure 9:
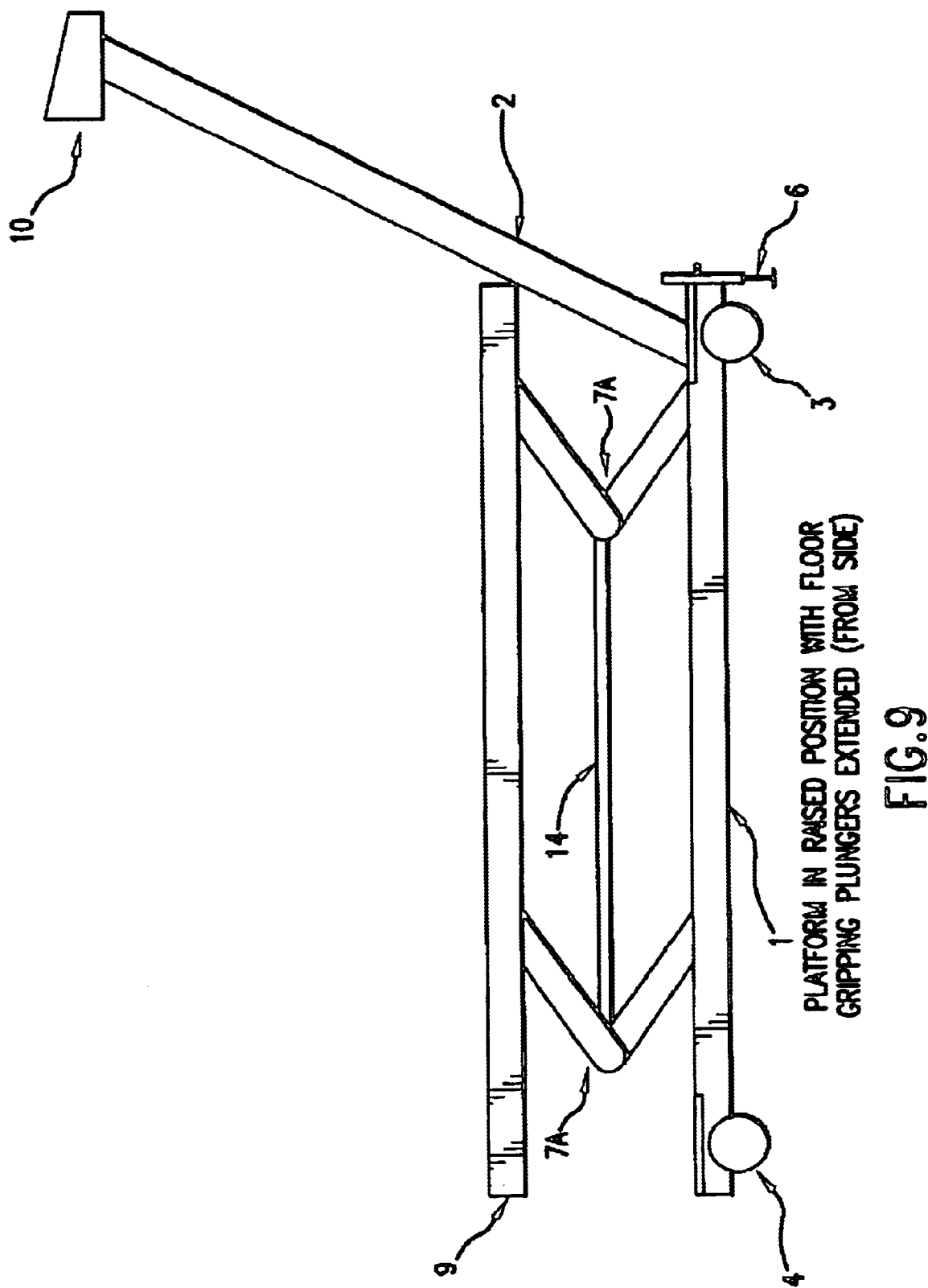
FIG. 9 shows a side view of the scale with the handle, the display and two parallel angled linkages. The platform is in a raised position with pop-down floor grips in the locked position.

See FIG. 7. These are operated by pressing a toe on a piston held by sprung metal to lock the grip, and released by pressing a toe on the piston or the sprung metal depending on the design, and simply release the pressure on the wheels so the frame does not roll, which is shown in exaggerated fashion in FIG. 7. A continuous axle for better weight distribution may be used (13B). FIG. 8 shows the floor gripping plunger or "pop-down floor grip" in the upright mode allowing the mobile bed scale to roll. FIG. 9 shows the platform lowered, and the floor gripping plungers up and the scale ready-to-roll. In total, however, with the screw drive, the lifting is so small that the horizontal displacement is not significant, and on a floor, the weight of the bed and scale are likely sufficient to not require any immobilization of the scale.

Figure 12:
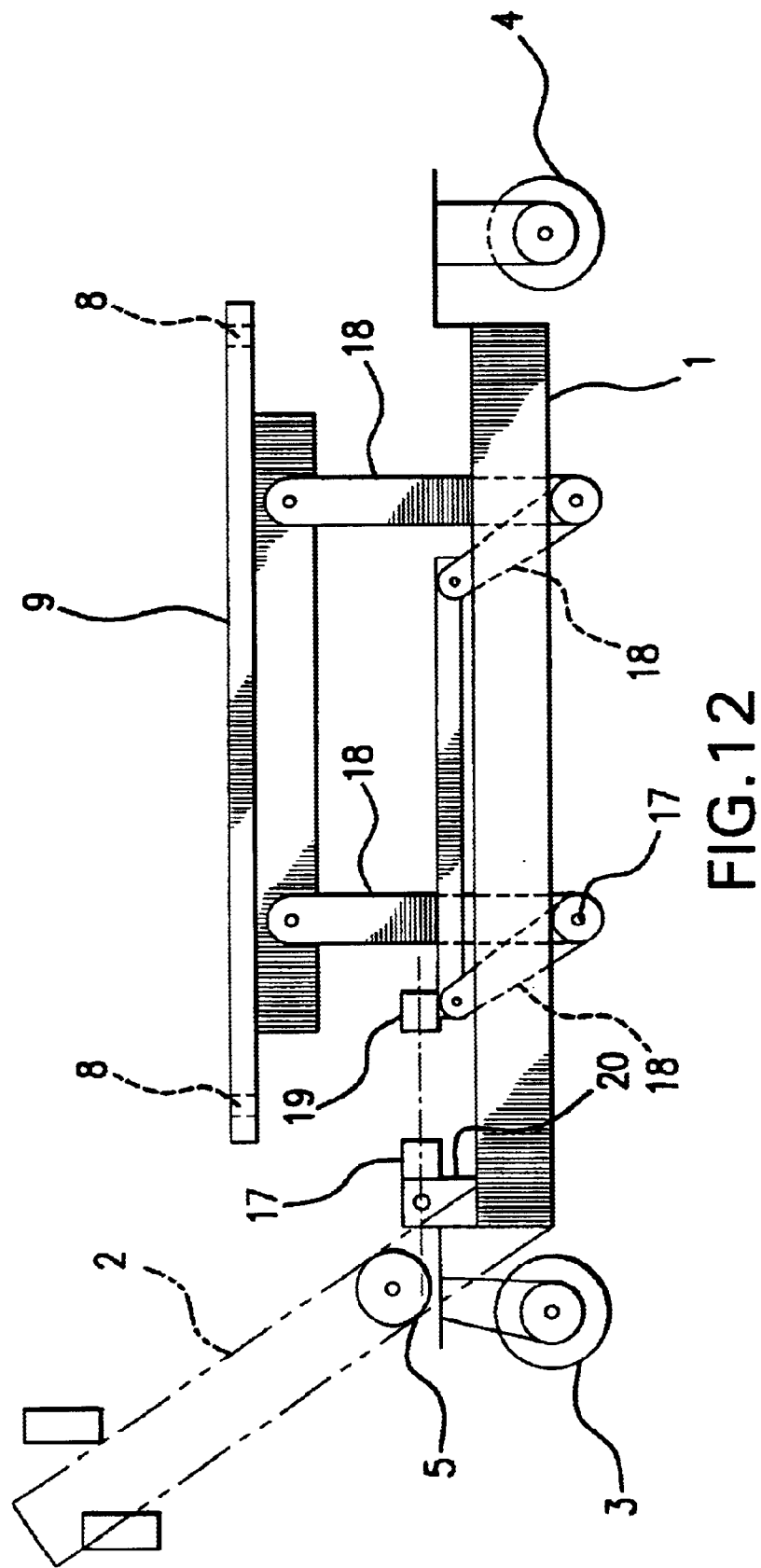
FIG. 12 shows a side view of an electrically operated screw drive system without some interior detail of linkage of the screw drive.
Figure 13:
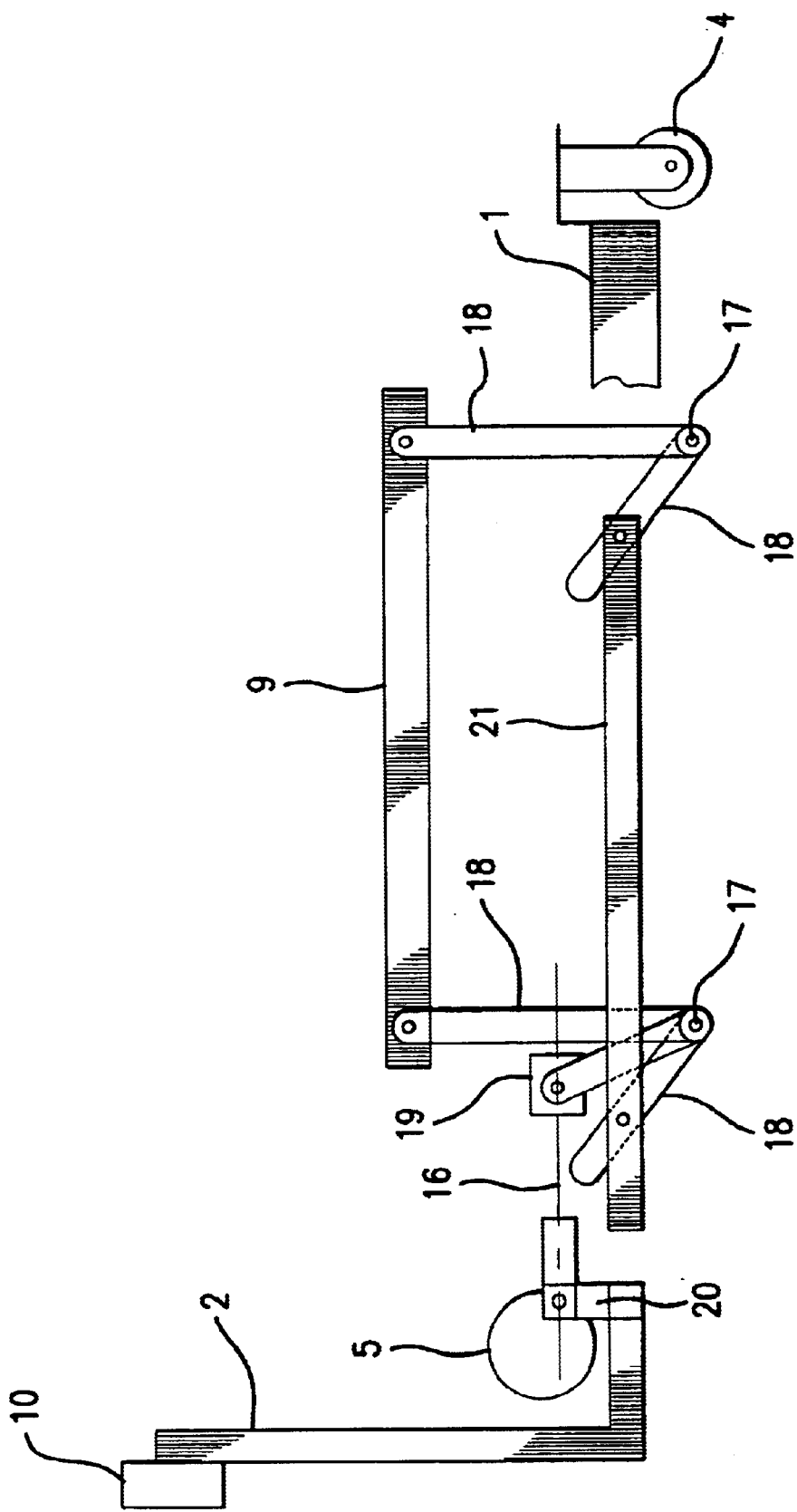
FIG. 13 shows a longitudinal cross section from a side view without the mobile base frame and shows the linkage more directly.
Figure 14:
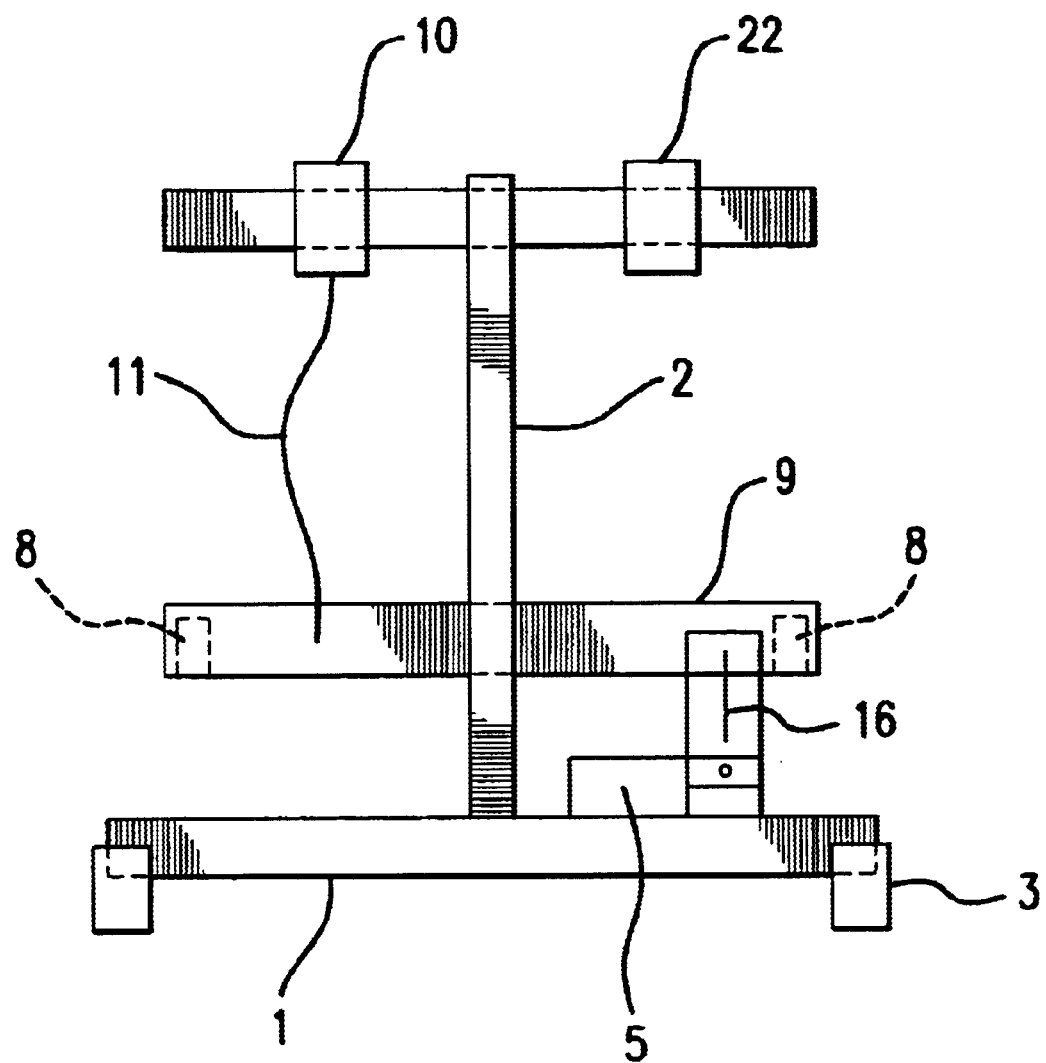
FIG. 14 shows a rear view without the linkage, but shows the relative position of the screw drive to the motor with the platform partially raised.

Mounted on the mobile frame base is a lifting apparatus (7). The lifting is caused by a power source (5). This is preferably an electric motor operating a screw drive. In FIGS. 12, 13, and 14, a system is used contemplates a motor that turns a screw drive (16). The screw drive works through a moveable brace (20) mounted with a pivot(17) on the mobile base frame (1). The screw drives a second brace (19) which is connected to a linkage (18) (in this design, with two arms) which, pivoting on the base levers the platform (9) supporting the bed upwards. A tie bar (21.) coordinates the lifting arms. That lifting apparatus is preferably used to elevate a platform with load cells (8). The lifting mechanism can also be a scissors mechanism, but could be two parallel angled linkages on each side are linked at a center pivot point by a tie bar (7). See FIGS. 1 and 9. The two parallel angled linkages shown in FIG. 1 and FIG. 9 can be reversed so that the apex of the angle formed at the point indicated (7) faces the handle (2). If so reversed, much like a car jack, where upward pressure is generated by pulling threaded blocks together with a screw at the "bending elbows" of the car jack, in this invention, a piston is to be used to place pressure on the side of the scissors to create upward lift. Alterative, a piston could be used to lift the platform directly and the scissors mechanism or the pivot mechanism could be used to stabilize the upward rise of the platform. A lifting apparatus tie rod (14), perpendicular to the length of the mobile bed frame, may be used to tie the sides of the lifting or stabilizing mechanism together.

The horizontal bed support or platform (9) is equipped with load cells. The platform can be purchased "off-the-shelf" with the load cells (8). The load cells generate an electrical output transmitted through a data cable or wire harness (11) serving as a data transmission means to a display indicating the weight of the load on the platform.

Whatever power source is used, the power source operates directly or indirectly against the lifting apparatus. The best electric power source is one that uses a power source such as a battery, or that requires a plug inserted into an electrical outlet in the wall. Alternatively, a hydraulic pump to turn the screw drive can be used. It should be recognized that it is not preferable to have any more lift of the bed than is necessary. Subject to the positioning of the bed on the platform, once the bed is lifted so its entire weight is on the platform, sufficient lift has been achieved. This may require as little as a fraction of an inch. If the wheel spring mechanism, the wheel locks or the pop-down floor grips such as one uses for holding open doors are used, there will not only be little horizontal displacement, but also little vertical displacement of a patient bed.

After the pump has been operated upward, reversal of a switch (22) reverses the process. The preferred switch is a three position switch with up, off, and down positions to selectively power the motor for the desired operation of the scale.

In the preferred mode of invention, though not necessary if certain manual functions are performed, a small memory device (10) is mounted to the handle (2). The small memory device is defined as one which is programmed to perform at least one of the following functions: store bed tare weights and store patient weights. Those weights are used for recall and input to patient charts (10A–10H). Such memory device can be also programmed and includes devices programmed to store and relate a date. Normally the display device and memory device would be in the same "box" and would include not only the memory device (10A), but also an LCD or LED display (10B), a tare weight input device (10C), an on-off switch (10D), a net/gross selector switch (10E), an RS-232 port (10F), a rechargeable battery (10G), a recharger port (10H), and may or may not include a portable recharger (10I), all of which are shown in FIG. 4. A practical sort of display device and platform scale adaptable to this invention are made by Arlyn Scales of Lynbrook, N.Y. A wireless data transmission device could be located in the display device working with the memory device to be continuously downloaded or downloaded in a batch at a selected time or place. A removable memory box to be placed in a cradle that can transmit information in the removable memory box such as used by a Palm Pilot in the Hot Sync system (both trademarks and products of Palm, Inc.) facilitates data transfer.

The reference in this specification and claims to "horizontal bed support" is intended to include a platform or a framework that accomplishes the same function as a platform. The horizontal bed support in this invention is intended to stably support the hospital bed as the bed is lifted with the patient in situ. The reference in this specification and claims to "piezoelectric sensors" in intended to include the class of sensors emitting an electronic signal in proportion to weight referenced in the trade as load cells.

An electric motor with screw drive operated device is defined to include any electrically operated device having any requisite static discharge or spark arresting apparatus.

Electrically driven power source is generally intended to refer to a motor or electrically operated lift, including a pump having any requisite static discharge or spark arresting apparatus.

Figure 10:
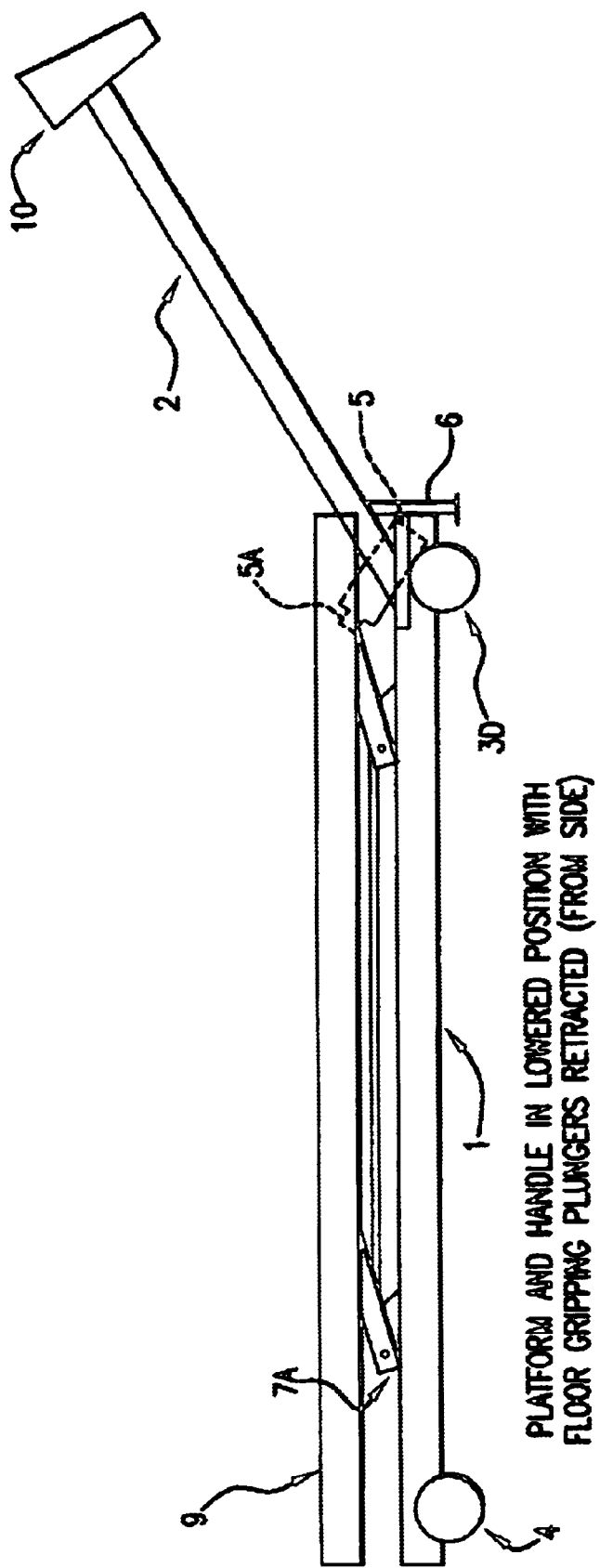
FIG. 10 shows FIG. 9 in the lowered position. The handle is shown as being maneuvered to be lowered even though pop-down floor grips are used.
Figure 11:
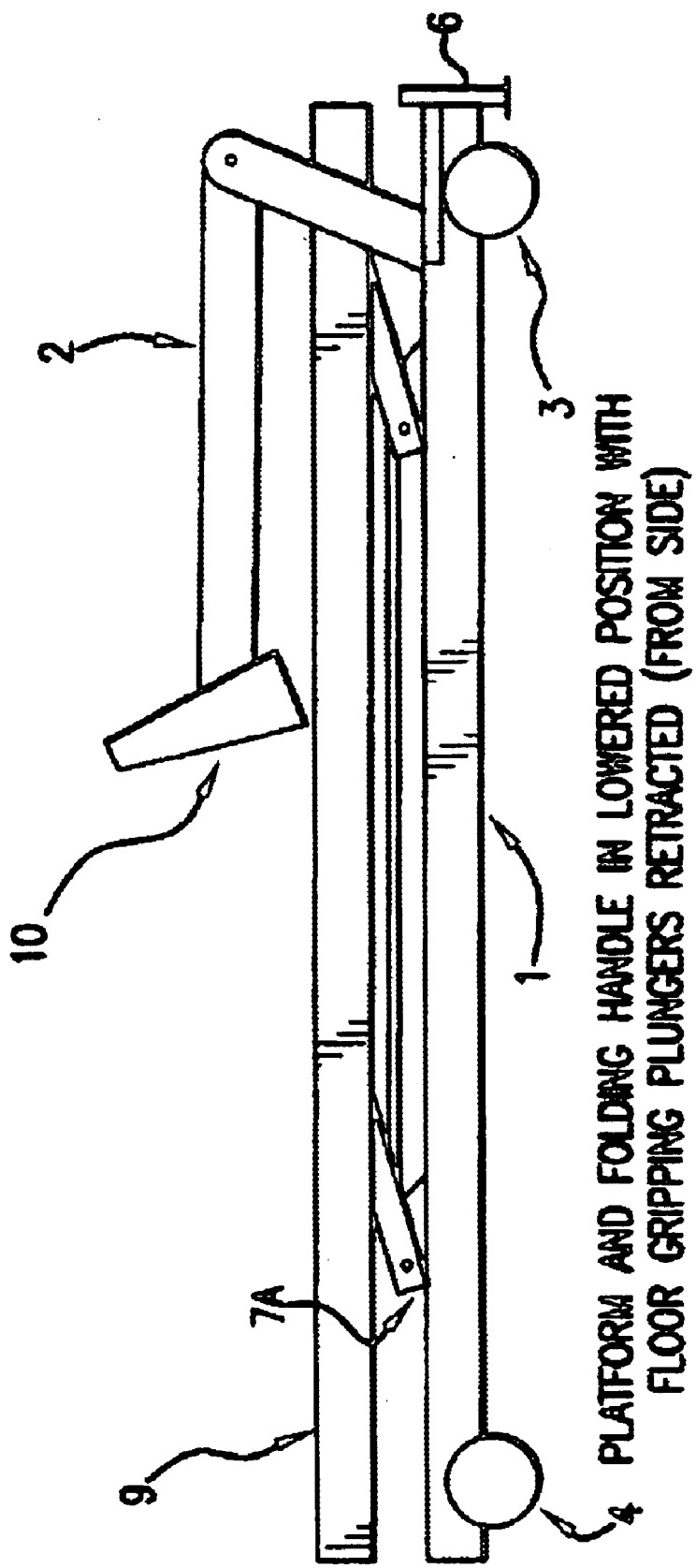
FIG. 11 shows a folding handle feature.added to FIG. 9 with the scale in the lowered position ready to be moved and stored.

A folding handle may also be used as shown in FIG. 11. FIG. 11 is similar to FIG. 10 with the handle folded down and a handle pivot shown. FIG. 11 also shows steering wheels (4) at the end of the scale away form the handle.

The attachment means referenced in the claims may be a linkage bar to the end of the piston or screw drive (5A) of the power source (5) opposite the mount of the power source. The power source (pump or motor) (5) and piston or screw drive (5A) could be installed to apply pressure against the linkage bar and pull the lifting apparatus tie rod (14) as shown in FIG. 7.

The reference in this specification and claims to "horizontal bed support" is intended to include a platform or a framework that accomplishes the same function as a platform. The horizontal bed support in this mention is intended to stably support the hospital bed as the bed is lifted with the patient in situ. The reference in this specification and claims to "piezoelectric sensors" in intended to include the class of sensors emitting an electronic signal in proportion to weight referenced in the trade as load cells.

The embodiments represented herein are only a few of the many embodiments and modifications that a practitioner reasonably skilled in the art could make or use. The invention is not limited to these embodiments nor to the versions encompassed in the figures which are intended as an aid to understanding the invention and are not meant to limit the disclosure or the claims. Alternative embodiments and modifications which would still be encompassed by the invention may be made by those skilled in the art, particularly in light of the foregoing teachings. Therefore, the following claims are intended to cover any alternative embodiments, modifications or equivalents which may be included within the spirit and scope of the invention as claimed.

We claim:

1. A mobile bed scale comprising:

a mobile base frame moved on a floor;

a horizontal bed support to be slid under a hospital bed sufficiently large to stably support such bed when such horizontal bed support is raised;

lifting apparatus for elevating said horizontal bed support with no horizontal displacement of a hospital bed being lifted;

said lifting apparatus for elevating said horizontal bed support being mounted on said mobile base and being mounted generally beneath and adjacent to said horizontal bed support;

said lifting apparatus being a mechanical scissors lift;

said horizontal bed support, said lifting apparatus, and said mobile base frame being sufficiently low above said planar surface on which said mobile base frame is moved to be slid under a hospital bed;

a fluid-driven power source for causing said lifting apparatus to elevate said horizontal bed support;

said power source being mounted on said mobile bed scale;

said power source being further operable by a human without auxiliary power;

said power source for causing said lifting apparatus to elevate said horizontal bed support, and said horizontal bed support, being adjustably operable to a raised position by a human from a standing position;

said horizontal bed support having a weight sensing means;

said weight sensing means being at least three piezoelectric sensors;

said weight sensing means being connected by a wire harness to a display;

said display means being mounted on said mobile base frame on an arm extending generally upwards from said mobile base frame to permit visual perception of said display means by a human in a standing position; and at least one pop-down floor grip to prevent said mobile bed scale from moving during patient weighing, which grip is actuable and releaseable by foot action.

2. The mobile bed scale according to claim 1, further comprising:

a wireless data transmitter connected to a memory storage device;

said memory storage device storing at least one bed tare weight and at least one patient weight for recall and display on said display means.

3. The mobile bed scale according to claim 2, further comprising:

a means of folding down said arm to facilitate storage.

4. The mobile bed scale according to claim 3, further comprising:

a recharging outlet.

5. The mobile bed scale according to claim 4, further comprising:

a recharger.

6. A mobile bed scale comprising:

a mobile base frame moved on a floor;

a horizontal bed support to be slid under a hospital bed sufficiently large to stably support such bed when such horizontal bed support is raised;

lifting apparatus for elevating said horizontal bed support with no horizoital displacement of a hospital bed being lifted;

said lifting apparatus for elevating said horizontal bed support being mounted on said mobile base and being mounted generally beneath and adjacent to said horizontal bed support;

said lifting apparatus being a mechanical scissors lift;

said horizontal bed support, said lifting apparatus, and said mobile base frame being sufficiently low above said planar surface on which said mobile base frame is moved to be slid under a hospital bed;

a fluid-driven power source for causing said lifting apparatus to elevate said horizontal bed support;

said power source being mounted on said mobile bed scale;

said power source being further operable by a human without auxiliary power;

said power source for causing said lifting apparatus to elevate said horizontal bed support, and said horizontal bed support, being adjustably operable to a raised position by a human from a standing position;

said horizontal bed support having a weight sensing means;

said weight sensing means being at least three piezoelectric sensors;

said weight sensing means being connected by a wire harness to a display means;

said display means being mounted on said mobile base frame on an arm extending generally upwards from said mobile base frame to permit visual perception of said display means by a human in a standing position;

at least one wheel-locking apparatus to prevent said mobile bed scale from moving during patient weighing.

7. The mobile bed scale according to claim 6, further comprising:

a memory storage device;

said memory storage device storing at least one bed tare weight and at least one patient weight for recall and display on said display means.

8. The mobile bed scale according to claim 7, further comprising:

a means of folding down said arm to facilitate storage.

9. The mobile bed scale according to, claim 8, further comprising:

a recharging outlet.

10. The mobile bed scale according to claim 9, further comprising:

a recharger.

11. A mobile bed scale comprising:

a mobile base frame moved on a floor;

a horizontal bed support to be slid under a hospital bed sufficiently large to stably support such bed when such horizontal bed support is raised;

said horizontal bed support having a non-slip surface at least where said horizontal bed support contacts a hospital bed;

stabilization apparatus to minimize horizontal displacement of a hospital bed being lifted;

said stabilization apparatus being mounted on said mobile base and generally beneath and adjacent to said horizontal bed support;

said horizontal bed support, said stabilization apparatus, and said mobile base frame being sufficiently low above said planar surface on which said mobile base frame is moved to be slid under a hospital bed;

a fluid-driven power source for causing said lifting apparatus to elevate said horizontal bed support;

said power source being mounted on said mobile bed scale;

said power source being further operable by a human without auxiliary power;

said power source for causing said lifting apparatus to elevate said horizontal bed support, and said horizontal bed support, being adjustably operable to a raised position by a human from a standing position;

said horizontal bed support having a weight sensing means;

said weight sensing means being at least three piezoelectric sensors; said weight sensing means being connected by a wire harness to a display means;

said display means being mounted on said mobile base frame on an arm extending generally upwards from said mobile base frame to permit visual perception of said display means by a human in a standing position;

at least one wheel-locking apparatus to prevent said mobile bed scale from moving during patient weighing.

12. The mobile bed scale according to claim 11, further comprising:

a memory storage device;

said memory storage device storing at least one bed tare weight and at least one patient weight for recall and display on said display means.

13. The mobile bed scale according to claim 12, further comprising:

a means of folding down said arm to facilitate storage.

14. The mobile bed scale according to claim 13, further comprising:

a recharging outlet.

15. The mobile bed scale according to claim 14, further comprising:

a recharger.

16. The mobile bed scale according to claim 15, further comprising:

said power source having a piston;

said stabilization apparatus having a lifting apparatus tie rod to synchronize said movement of said stabilization apparatus;

said piston having an attachment means from said piston to said lifting apparatus tie rod.

17. The mobile bed scale according to claim 16, further comprising:

said attachment means being a linkage bar.

18. The mobile bed scale according to claim 17, further comprising:

a means of folding down said arm to facilitate storage.

19. The mobile bed scale according to claim 18, further comprising:

a recharging outlet.

20. The mobile bed scale according to claim 19, further comprising:

a recharger.

21. An electrically operated mobile bed scale for weighing patients in situ comprising:

a mobile base frame moved on a floor;

a horizontal bed support to be slid under a hospital bed sufficiently large to stably support such bed when such horizontal bed support is raised;

stabilization apparatus to minimize horizontal displacement of a hospital bed being lifted;

said stabilization apparatus being mounted on said mobile base and generally beneath and adjacent to said horizontal bed support;

said horizontal bed support, said stabilization apparatus, and said mobile base frame being sufficiently low above said planar surface on which said mobile base frame is moved to be slid under a hospital bed;

an electrically operated power source for causing said lifting apparatus to elevate said horizontal bed support;

said power source being mounted on said mobile bed scale;

said power source for causing said lifting apparatus to elevate said horizontal bed support, and said horizontal bed support, being adjustably operable to a raised position;

said horizontal bed support having a weight sensing means;

said weight sensing means being at least three piezoelectric sensors; said weight sensing means being connected by a wire harness to a display; and said display means being mounted on said mobile base frame on an arm extending generally upwards from said mobile base frame to permit visual perception of said display means by a human in a standing position.

22. The electrically operated mobile bed scale according to claim 21, further comprising:
a memory storage device;
said memory storage device string at least one bed tare weight and at least one patient weight for recall and display on said display means.

23. The mobile bed scale according to claim 22, further comprising:
battery for operating said power source.

24. The mobile bed scale according to claim 23, further comprising:
a recharger.

25. The mobile bed scale according to claim 24, further comprising:
a recharging outlet.

26. The mobile bed scale according to claim 25, further comprising:
a means of folding down said arm to facilitate storage.

27. The mobile bed scale according to claim 26, further comprising:
a wireless data transmitter connected to said memory storage device.

28. The mobile bed scale according to claim 27, further comprising:
at least one wheel-locking apparatus to prevent said mobile bed scale from moving during patient weighing.

29. The mobile bed scale according to claim 25, further comprising:
said power source having a screw drive;
said stabilization apparatus having a lifting apparatus tie rod to synchronize said movement of s aid stabilization apparatus;
said screw drive having an attachment means from said screw drive to said lifting apparatus tie rod.

30. The mobile bed scale according to claim 29, further comprising:
a wireless data transmitter connected to said memory storage device.

31. The mobile bed scale according to claim 30, further comprising:
said attachment means being a linkage bar.

32. The mobile bed scale according to claim 31, further comprising:
a means of folding down said arm to facilitate storage.

33. The mobile bed scale according to claim 32, further comprising:
at least one wheel-locking apparatus to prevent said mobile bed scale from moving during patient weighing.

34. An electrically operated mobile bed scale for weighing patients in situ comprising:
a mobile base frame moved on a floor;
a horizontal bed support to be slid under a hospital bed sufficiently large to stably support such bed when such horizontal bed support is raised;
stabilization apparatus to minimize horizontal displacement of a hospital bed being lifted;
said stabilization apparatus being mounted on said mobile base and generally beneath and adjacent to said horizontal bed support;
said horizontal bed support, said stabilization apparatus, and said mobile base frame being sufficiently low above said planar surface on which said mobile base frame is moved to be slid under a hospital bed;
an electrically operated power source for causing said lifting apparatus to elevate said horizontal bed support;
said power source being mounted on said mobile bed scale;
said power source for causing said lifting apparatus to elevate said horizontal bed support, and said horizontal bed support, being adjustably operable to a raised position;
said horizontal bed support having a weight sensing means;
said weight sensing means being at least three piezoelectric sensors; said weight sensing means being connected by a wire harness to a display means and to a memory storage device;
said display means being mounted on said mobile base frame on an arm extending generally upwards from said mobile base frame to permit visual perception of said display means by a human in a standing position; and
said memory storage device storing at least one bed tare weight and at least one patient weight for recall and display on said display means.

35. The mobile bed scale according to claim 34, further comprising:
a battery for operating said power source.

36. The mobile bed scale according to claim 35, further comprising:
a recharger.

37. The mobile bed scale according to claim 36, further comprising:
a recharging outlet.

38. The mobile bed scale according to claim 37, further comprising:
a means of folding down said arm to facilitate storage.

39. The mobile bed scale according to claim 38, further comprising:
a wireless data transmitter connected to said memory storage device.

40. The mobile bed scale according to claim 39, further comprising;
at least one wheel-locking apparatus to prevent said mobile bed scale from moving during patient weighing.

41. The mobile bed scale according to claim 37, further comprising:
said power source having a screw drive;
said stabilization apparatus having a lifting apparatus tie rod to synchronize said movement of said stabilization apparatus;
said screw drive having an attachment means from said screw drive to said lifting apparatus tie rod.

42. The mobile bed scale according to claim 41, further comprising:
a wireless data transmitter connected to said memory storage device.

43. The mobile bed scale according to claim 42, further comprising:
said attachment means being a linkage bar.

44. The mobile bed scale according to claim 43, further comprising:
a means of folding down said arm to facilitate storage.

45. The mobile bed scale according to claim 44, further comprising:
at least one wheel-locking apparatus to prevent said mobile bed scale from moving during patient weighing.

46. A method of weighing a patient in situ comprising the following steps:

determining the tare weight of a hospital bed without a patient in said bed;

weighing a patient by sliding a mobile bed scale having a horizontally stable horizontal bed support under a hospital bed and by elevating a patient's entire hospital bed with the patient in situ on said horizontally stable horizontal bed support without necessity of attachment or extension of said horizontal bed support in order to elevate said hospital bed, said mobile bed scale stably supporting said bed and containing load cells, said mobile bed scale having a fluid-driven power source for causing said lifting apparatus to elevate said horizontal bed support; said mobile bed scale having means of display, said mobile bed scale having a data transmission means connected from said load cells to said means of display.

47. The method of weighing a patient in their hospital bed according to the method of claim 46, further comprising the following steps:

transmitting such tare weight to a memory storage device;

connecting said data transmission means to said memory, storage device integrated with said means of display which reports and stores patient weight by automatically calculating the difference between weight measured by load cells and the tare weight of said hospital bed.

48. The method of weighing a patient in their hospital bed according to the method of claim 47, further comprising the following step:

utilizing a power source operable by either a portable battery or by plug-in to a fixed outlet in a structure.

49. The method of weighing a patient in their hospital bed according to the method of claim 48, further comprising the following step:

connecting a recharger to said mobile hospital bed scale.

50. The method of weighing a patient in their hospital bed according to the method of claim 49, further comprising the following step:

connecting a wireless data transmitter to said memory storage device.

51. A method of weighing a patient in situ comprising the following steps:

determining the tare weight of a hospital bed without a patient in said bed;

weighing a patient by sliding a mobile bed scale having a horizontally stable horizontal bed support under a hospital bed and by elevating a patient's entire hospital bed with the patient in situ on said horizontally stable horizontal bed support without necessity of attachment or extension of said horizontal bed support in order to elevate said hospital bed, said mobile bed scale stably supporting said bed and containing load cells, said mobile bed scale having an electrically operated power source for causing said lifting apparatus to elevate said horizontal bed support; said mobile bed scale having means of display, and said mobile bed scale having a data transmission means connected from said load cells to said means of display.

52. The method of weighing a patient in their hospital bed according to the method of claim 51, further comprising the following step:

mounting a screw drive on said electrically operated power source.

53. The method of weighing a patient in their hospital bed according to the method of claim 52, further comprising the following steps:

transmitting such tare weight to a memory storage device;

connecting said data transmission means to said memory storage device integrated with said means of display which reports and stores patient weight by automatically calculating the difference between weight measured by load cells and the tare weight of said hospital bed.

54. The method of weighing a patient in their hospital bed according to the method of claim 53, further comprising the following step:

utilizing a power source operable by either a portable battery or by plug-in to a fixed outlet in a structure.

55. The method of weighing a patient in their hospital bed according to the method of claim 54, further comprising the following step:

connecting a battery to operate said power source.

56. The method of weighing a patient in their hospital bed according to the method of claim 55, further comprising the following step:

connecting a recharger to said mobile hospital bed scale.

57. The method of weighing a patient in their hospital bed according to the method of claim 56, further comprising the following step connecting a wireless data transmitter to said memory storage device.

58. A method of making a mobile hospital bed scale comprising the following steps:

assembling a lifting apparatus to a horizontal bed support having at least three piezoelectric sensors, said lifting apparatus being capable of being slid under a hospital bed and stably supporting a patient's entire hospital bed with the patient in situ on said lifting apparatus without necessity of attachment or extension of said horizontal bed support in order to elevate said hospital bed, and being capable of lifting said hospital bed with minimal horizontal displacement;

assembling a mobile base frame to said lifting apparatus;

disposing a fluid-driven power source on said mobile base frame to cause said horizontal bed support to be elevated;

connecting a weight sensing means to a wire harness;

connecting said data transmission means to a display means; and mounting said display means on an arm, said display means being perceptible to a standing human; and connecting said arm to said mobile bed scale.

59. The method of making mobile hospital bed scale according to the method of claim 58, further comprising the following step:

utilizing a power source operable by either a portable battery or by plug-in to a fixed outlet in a structure.

60. The method of making a mobile hospital bed scale according to the method of claim 59, further comprising the following step:

connecting said data transmission means to a memory storage device.

61. The method of making a mobile hospital bed scale according to the method of claim 60, further comprising the following step:

connecting a recharger to said mobile hospital bed scale.

62. The method of weighing a patient in their hospital bed according to the method of claim 61, further comprising the following step:

connecting a wireless data transmitter to said memory storage device.

63. A method of making a mobile hospital bed scale comprising the following steps:

assembling a lifting apparatus to a horizontal bed support having at least three piezoelectric sensors, said lifting apparatus being capable of being slid under a hospital bed and stably supporting patient's entire hospital bed with the patient in situ on said lifting apparatus without necessity of attachment or extension of said horizontal bed support in order to elevate said hospital bed, and being capable of lifting said hospital bed with minimal horizontal displacement;

assembling a mobile base frame to said lifting apparatus;

disposing an electrically operated power source on said mobile base frame to cause said horizontal bed support to be elevated;

connecting a weight sensing means to a wire harness;

connecting said data transmission means to a display means; and mounting said display means on an arm, said display means being perceptible to a standing human; and connecting said arm to said mobile bed scale.

64. The method of making a mobile hospital bed scale according to the method of claim 63, further comprising the following step:

mounting a screw drive on said electrically operated power source.

65. The method of making mobile hospital bed scale according to the method of claim 64, further comprising the following step:

utilizing a power source operable by either a portable battery or by plug-in to a fixed outlet in a structure.

66. The method of making a mobile hospital bed scale according to the method of claim 65, further comprising the following step:

connecting said data transmission means to a memory storage device.

67. The method of making a mobile hospital bed scale according to the method of claim 66, further comprising the following step:

connecting a battery to operate said power source.

68. The method of making a mobile hospital bed scale according to the method of claim 67, further comprising the following step:

connecting a recharger to said mobile hospital bed scale.

69. The method of making a mobile hospital bed scale according to the method of claim 68, further comprising the following step:

connecting a wireless data transmitter to said memory storage device.

70. A mobile bed scale comprising:

a mobile base frame moved on a floor;

a means for supporting a bed, to be slid under a hospital bed, said means being sufficiently large to stably support such bed when said means for supporting a bed is raised;

a lifting apparatus for elevating said means for supporting a bed with minimal horizontal displacement of a hospital bed being lifted;

said lifting apparatus for elevating said means for supporting a bed being mounted on said mobile base and being mounted generally beneath and adjacent to said means for supporting a bed;

said means for supporting a bed, said lifting apparatus, and said mobile base frame being sufficiently low above said planar surface on which said mobile base frame is moved to be slid under a hospital bed;

a power source for causing said lifting apparatus to elevate said means for supporting a bed;

said power source being mounted on said mobile bed scale;

said power source for causing said lifting apparatus to elevate said means for supporting a bed and said means for supporting a bed being adjustably operable to a raised position by a human from a standing position;

said means for supporting a bed having a weight sensing means;

said weight sensing means being at least three piezoelectric sensors;

said weight sensing means being connected by a data transmission means to a display means;

said display means being mounted on said mobile base frame on an arm extending generally upwards from said mobile base frame to permit visual perception of said display means by a human in a standing position;

said mobile base frame having wheels;

said power source being fluid-driven;

said data transmission means being a wire harness and being connected to a memory storage device;

linkage between said wheels and said arm connected to said mobile base frame so that upon raising said arm, said mobile base frame is substantially in contact with said planar surface to stably support said hospital bed being lifted;

said memory storage device storing at least one bed tare weight and at least one patient weight for recall and display on said display means;

said means for supporting a bed having a non-slip surface at least where said means for supporting a bed contacts a hospital bed;

a wireless data transmitter connected to said memory storage device.

71. The mobile bed scale according to claim 70, further comprising:

a means of folding down said arm to facilitate storage.

72. The mobile bed scale according to claim 71, further comprising:

a recharging outlet.

73. The mobile bed scale according to claim 71, further comprising:

a recharger.

74. The mobile bed scale according to claim 71, further comprising:

said power source having electrically operated auxiliary power.

75. A mobile bed scale comprising:

a mobile base frame moved on a floor;

a means for supporting a bed, to be slid under a hospital bed, said means being sufficiently large to stably support such bed when said means for supporting a bed is raised;

a lifting apparatus for elevating said means for supporting a bed with minimal horizontal displacement of a hospital bed being lifted;

said lifting apparatus for elevating said means for supporting a bed being mounted on said mobile base and being mounted generally beneath and adjacent to said means for supporting a bed;

said means for supporting a bed, said lifting apparatus, and said mobile base frame being sufficiently low above said planar surface on which said mobile base frame is moved to be slid under a hospital bed;

a power source for causing said lifting apparatus to elevate said means for supporting a bed;

said power source being mounted on said mobile bed scale;

said power source for causing said lifting apparatus to elevate said means for supporting a bed and said means for supporting a bed being adjustably operable to a raised position by a human from a standing position;

said means for supporting a bed having a weight sensing means;

said weight sensing means being at least three piezoelectric sensors;

said weight sensing means being connected by a data transmission means to a display means;

said display means being mounted on said mobile base frame on an arm extending generally upwards from said mobile base frame to permit visual perception of said display means by a human in a standing position;

said power source being fluid-driven;

said data transmission means being a wire harness and being connected to a memory storage device;

wheel-locking apparatus;

said memory storage device storing at least one bed tare weight and at least one patient weight for recall and display on said display means;

said means for supporting a bed having a non-slip surface at least where said means for supporting a bed contacts a hospital bed;

a wireless data transmitter connected to said memory storage device.

76. The mobile bed scale according to claim 75, further comprising:

a means of folding down said arm to facilitate storage.

77. The mobile bed scale according to claim 76, further comprising:

a recharging outlet.

78. The mobile bed scale according to claim 76, further comprising:

a recharger.

79. The mobile bed scale according to claim 76, further comprising:

said power source having electrically operated auxiliary power.

80. A mobile bed scale comprising:

a mobile base frame moved on a floor;

a means for supporting a bed, to be slid under a hospital bed, said means being sufficiently large to stably support such bed when said means for supporting a bed is raised;

a lifting apparatus for elevating said means for supporting a bed with minimal horizontal displacement of a hospital bed being lifted;

said lifting apparatus for elevating said means for supporting a bed being mounted on said mobile base and being mounted generally beneath and adjacent to said means for supporting a bed;

said means for supporting a bed, said lifting apparatus, and said mobile base frame being sufficiently low above said planar surface on which said mobile base frame is moved to be slid under a hospital bed;

a power source for causing said lifting apparatus to elevate said means for supporting a bed;

said power source being mounted on said mobile bed scale;

said power source for causing said lifting apparatus to elevate said means for supporting a bed and said means for supporting a bed being adjustably operable to a raised position by a human from a standing position;

said means for supporting a bed having a weight sensing means;

said weight sensing means being at least three piezoelectric sensors;

said weight sensing means being connected by a data transmission means to a display means;

said display means being mounted on said mobile base frame on an arm extending generally upwards from said mobile base frame to permit visual perception of said display means by a human in a standing position;

said power source being fluid-driven;

said data transmission means being a wire harness and being connected to a memory storage device; and at least one pop-down floor grip actuable and releaseable by foot action;

said memory storage device storing at least one bed tare weight and at least one patient weight for recall and display on said display means;

said means for supporting a bed having a non-slip surface at least where said means for supporting a bed contacts a hospital bed;

a wireless data transmitter connected to said memory storage device.

81. The mobile bed scale according to claim 80, further comprising:

a means of folding down said arm to facilitate storage.

82. The mobile bed scale according to claim 81, further comprising:

a recharging outlet.

83. The mobile bed scale according to claim 81, further comprising:

a recharger.

84. The mobile bed scale according to claim 81, further comprising:

said power source having electrically operated auxiliary power.

85. A mobile bed scale comprising:

a mobile base frame moved on a floor;

a horizontal bed support to be slid under a hospital bed sufficiently large to stably support such bed when such horizontal bed support is raised;

a lifting apparatus for elevating said horizontal bed support with minimal horizontal displacement of a hospital bed being lifted;

said lifting apparatus for elevating said horizontal bed support being mounted on said mobile base and being mounted generally beneath and adjacent to said horizontal bed support;

said horizontal bed support, said lifting apparatus, and said mobile base frame being sufficiently low above said planar surface on which said mobile base frame is moved to be slid under a hospital bed;

said lifting apparatus for elevating said horizontal bed support having a central lifting axis defined by a line perpendicular to said horizontal bed support, said line being located approximately centered on all moments of said horizontal bed support when a hospital bed is on said horizontal bed support;

a power source for causing said lifting apparatus to elevate said horizontal bed support situated laterally to said central lifting axis;

said power source being mounted on said mobile bed scale;

said power source for causing said lifting apparatus to elevate said horizontal bed support, and said horizontal bed support, being adjustably operable to a raised position by a human from a standing position;

said horizontal bed support having a weight sensing means;

said weight sensing means being at least three piezoelectric sensors;

said weight sensing means being connected by a data transmission means to a display means;

said display means being mounted on said mobile base frame on an arm extending generally upwards from said mobile base frame to permit visual perception of said display means by a human in a standing position;

said mobile base frame having wheels;

said power source being fluid-driven;

said data transmission means being a wire harness and being connected to a memory storage device; and linkage between said wheels and said arm connected to said mobile base frame so that upon raising said arm, said mobile base frame is substantially in contact with said planar surface to stably support said hospital bed being lifted;

said memory storage device storing at least one bed tare weight and at least one patient weight for recall and display on said display means;

a wireless data transmitter connected to said memory storage device.

86. The mobile bed scale according to claim 85, further comprising:

a means of folding down said arm to facilitate storage.

87. The mobile bed scale according to claim 86, further comprising:

a recharging outlet.

88. The mobile bed scale according to claim 86, further comprising:

a recharger.

89. The mobile bed scale according to claim 86, further comprising:

said power source being further operable by a human without necessity of auxiliary power.

90. A mobile bed scale comprising:

a mobile base frame moved on a floor;

a horizontal bed support to be slid under a hospital bed sufficiently large to stably support such bed when such horizontal bed support is raised;

a lifting apparatus for elevating said horizontal bed support with minimal horizontal displacement of a hospital bed being lifted;

said lifting apparatus for elevating said horizontal bed support being mounted on said mobile base and being mounted generally beneath and adjacent to said horizontal bed support;

said horizontal bed support, said lifting apparatus, and said mobile base frame being sufficiently low above said planar surface on which said mobile base frame is moved to be slid under a hospital bed;

said lifting apparatus for elevating said horizontal bed support having a central lifting axis defined by a line perpendicular to said horizontal bed support, said line being located approximately centered on all moments of said horizontal bed support when a hospital bed is on said horizontal bed support;

a power source for causing said lifting apparatus to elevate said horizontal bed support situated laterally to said central lifting axis;

said power source being mounted on said mobile bed scale;

said power source for causing said lifting apparatus to elevate said horizontal bed support, and said horizontal bed support, being adjustably operable to a raised position by a human from a standing position;

said horizontal bed support having a weight sensing means;

said weight sensing means being at least three piezoelectric sensors;

said weight sensing means being connected by a data transmission means to a display means;

said display means being mounted on said mobile base frame on an arm extending generally upwards from said mobile base frame to permit visual perception of said display means by a human in a standing position;

said power source being fluid-driven;

said data transmission means being a wire harness; and wheel-locking apparatus;

said memory storage device storing at least one bed tare weight and at least one patient weight for recall and display on said display means;

said horizontal bed support having a non-slip surface at least where said horizontal bed support contacts a hospital bed;

a wireless data transmitter connected to said memory storage device.

91. The mobile bed scale according to claim 90, further comprising:

a means of folding down said arm to facilitate storage.

92. The mobile bed scale according to claim 91, further comprising:

a recharging outlet.

93. The mobile bed scale according to claim 91, further comprising:

a recharger.

94. The mobile bed scale according to claim 91, further comprising:

said power source being further operable by a human without necessity of auxiliary power being.

95. A mobile bed scale comprising:

a mobile base frame moved on a floor;

a horizontal bed support to be slid under a hospital bed sufficiently large to stably support such bed when such horizontal bed support is raised;

a lifting apparatus for elevating said horizontal bed support with minimal horizontal displacement of a hospital bed being lifted;

said lifting apparatus for elevating said horizontal bed support being mounted on said mobile base and being mounted generally beneath and adjacent to said horizontal bed support;

said horizontal bed support, said lifting apparatus, and said mobile base frame being sufficiently low above said planar surface on which said mobile base frame is moved to be slid under a hospital bed;

said lifting apparatus for elevating said horizontal bed support having a central lifting axis defined by a line perpendicular to said horizontal bed support, said line being located approximately centered on all moments of said horizontal bed support when a hospital bed is on said horizontal bed support;

a power source for causing said lifting apparatus to elevate said horizontal bed support situated laterally to said central lifting axis;

said power source being mounted on said mobile bed scale;

said power source for causing said lifting apparatus to elevate said horizontal bed support, and said horizontal bed support, being adjustably operable to a raised position by a human from a standing position;

said horizontal bed support having a weight sensing means;

said weight sensing means being at least three piezoelectric sensors;

said weight sensing means being connected by a data transmission means to a display means;

said display means being mounted on said mobile base frame on an arm extending generally upwards from said mobile base frame to permit visual perception of said display means by a human in a standing position;

said power source being fluid-driven;

said data transmission means being a wire harness; and at least one pop-down floor grip actuable and releaseable by foot action;

said memory storage device storing at least one bed tare weight and at least one patient weight for recall and display on said display means;

said horizontal bed support having a non-slip surface at least where said horizontal bed support contacts a hospital bed;

a wireless data transmitter connected to said memory storage device.

96. The mobile bed scale according to claim 95, further comprising:

a means of folding down said arm to facilitate storage.

97. The mobile bed scale according to claim 96, further comprising:

a recharging outlet.

98. The mobile bed scale according to claim 96, further comprising:

a recharger.

99. The mobile bed scale according to claim 96, further comprising:

said power source being further operable by a human without necessity of auxiliary power.

* * * * *